May 19, 1925.
E. E. DAVIS
HOLDING DEVICE
Filed Oct. 4, 1922
1,538,174
4 Sheets-Sheet 1
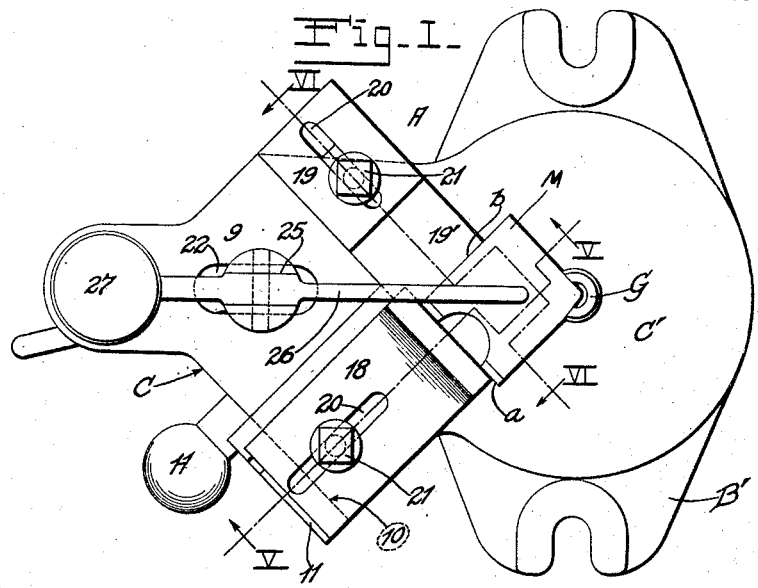
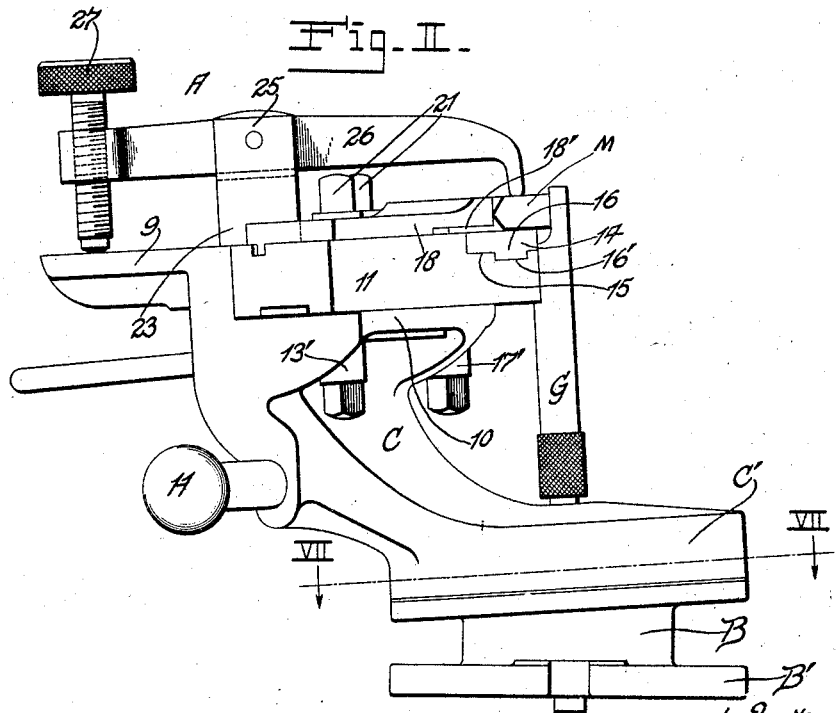
Inventor.
E. E. Davis,
By Cook & McCauley
His Attorneys.

May 19, 1925.
E. E. DAVIS
HOLDING DEVICE
Filed Oct. 4, 1922
1,538,174
4 Sheets-Sheet 2
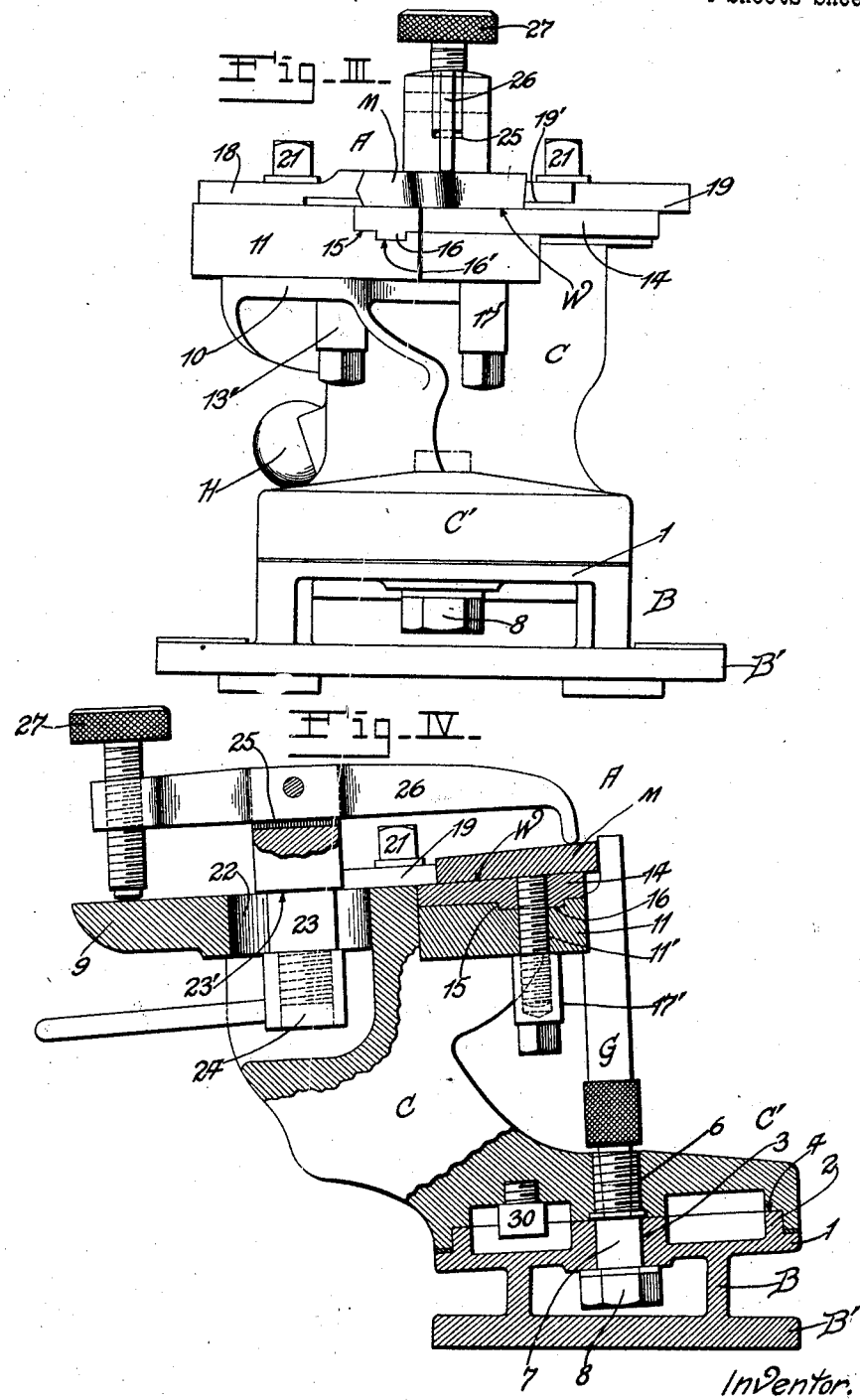

May 19, 1925.
E. E. DAVIS
1,538,174
HOLDING DEVICE
Filed Oct. 4, 1922
4 Sheets-Sheet 3
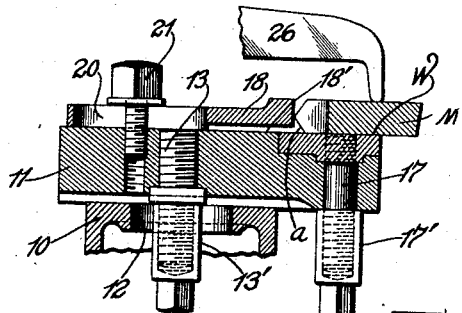
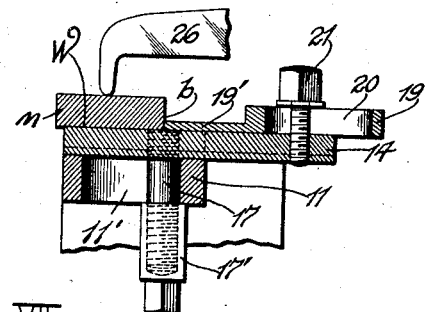
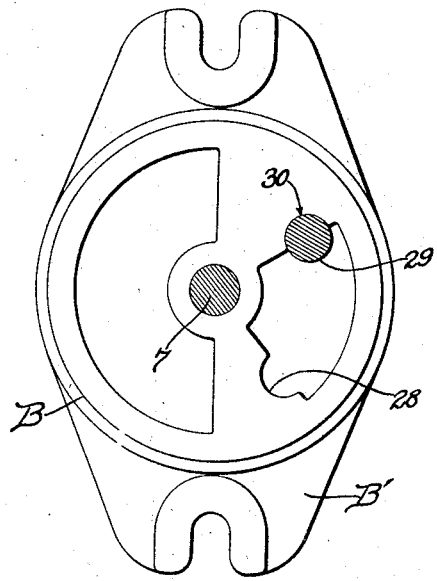
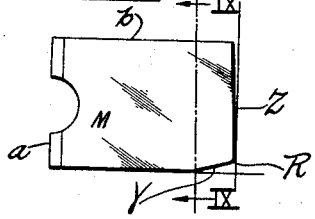
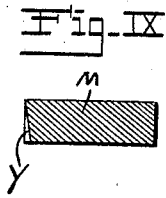
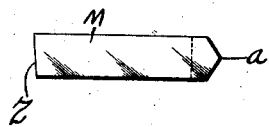

May 19, 1925.
E. E. DAVIS
HOLDING DEVICE
Filed Oct. 4, 1922
1,538,174
4 Sheets-Sheet 4
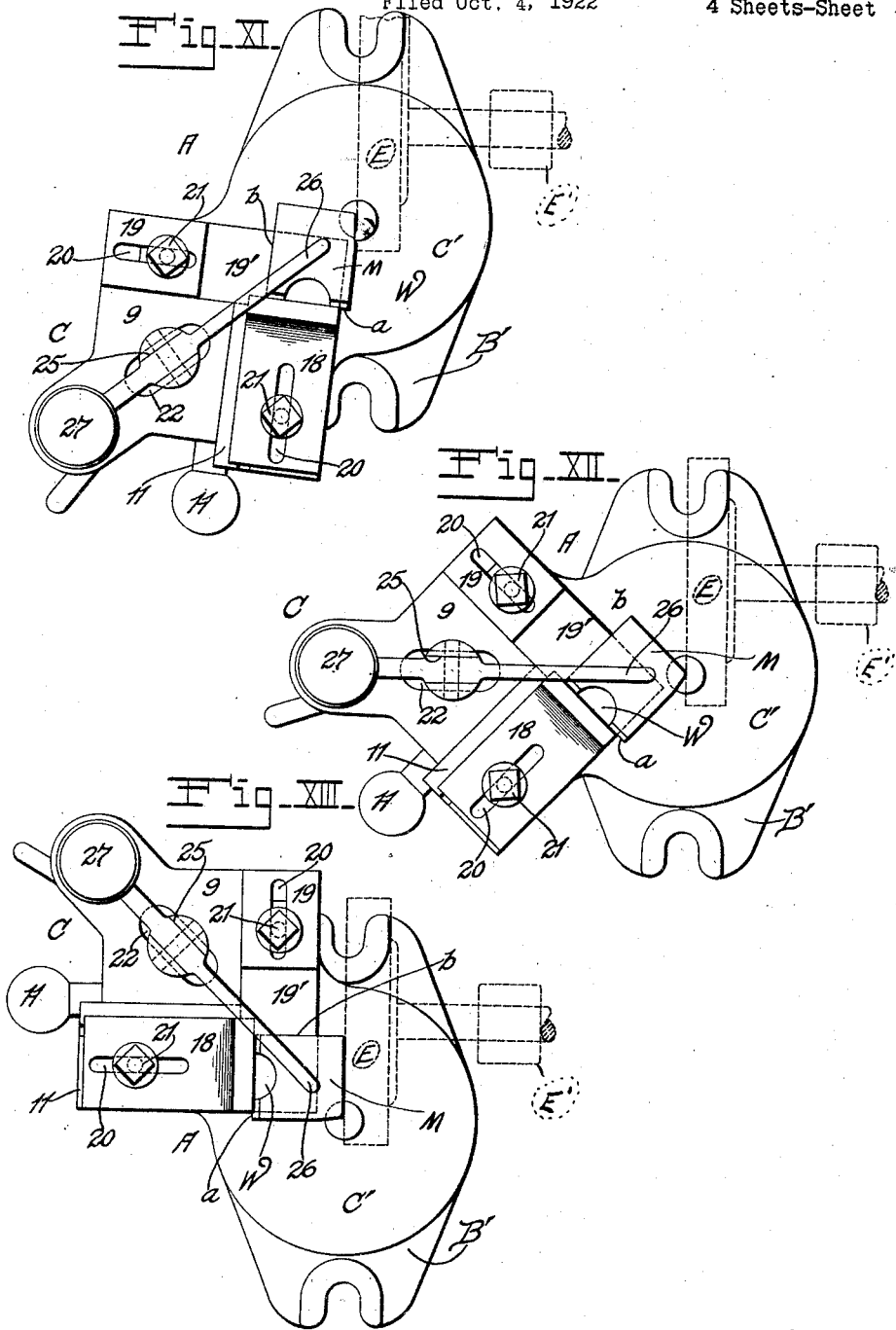
Inventor.
E. E. Davis,
By Cook & McCauley
His Attorneys.

Patented May 19, 1925.

1,538,174

UNITED STATES PATENT OFFICE.

EMERY E. DAVIS, OF ST. LOUIS, MISSOURI, ASSIGNOR TO DAVIS BORING TOOL COMPANY, OF ST. LOUIS, MISSOURI, A CORPORATION OF MISSOURI.

HOLDING DEVICE.

Application filed October 4, 1922. Serial No. 592,357.

*To all whom it may concern:*

Be it known that I, EMERY E. DAVIS, a citizen of the United States of America, a resident of the city of St. Louis, State of Missouri, have invented certain new and useful Improvements in Holding Devices, of which the following is a full, clear, and exact description, reference being had to the accompanying drawings, forming a part of this specification.

This invention relates to improvements in holding devices, and particularly to a device for holding the cutting members of boring tools while said cutting members are being sharpened.

The cutting members of a boring tool now in general use are each provided with a plurality of inclined cutting faces, which, of course, are dulled by use and must therefore be periodically resharpened. The successful operation of the boring tool in question depends upon the accurate sharpening of the cutting faces mentioned, and it is the object of the present invention to provide a holding device which will retain the cutting members in the proper positions while they are being sharpened. The device disclosed in the present application is so arranged that it will receive cutting members of various sizes and will bring the cutting faces of said cutting members into contact with the grinding element so that each of said cutting faces will be ground with the required accuracy, and said grinding operation is accomplished with much greater rapidity than was possible with the method heretofore used.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a plan view of my improved holding device, showing a cutting member in place therein.

Fig. II is a side elevation of the cutting device shown in Fig. I.

Fig. III is a front elevation of the holding device.

Fig. IV is a vertical section of the holding device, parts of said device being shown in elevation.

Fig. V is a section on line V—V of Fig. I.

Fig. VI is a section on line VI—VI of Fig. I.

Fig. VII is a section on line VII—VII of Fig. II.

Fig. VIII is a plan view of one of the cutting members.

Fig. IX is a section on line IX—IX of Fig. VIII.

Fig. X is a side elevation of the cutting member shown in Fig. VIII.

Figs. XI, XII and XIII are plan views of my improved holding device, showing the positions in which said device will be placed during the sharpening operation.

In the drawings, A designates my improved holding device which comprises a stationary base portion B and a rotatable work-supporting portion C. The stationary base portion B is provided with a plate B' provided with slots adapted to receive bolts or other fastening devices whereby the holding device may be rigidly fixed to the article upon which said device is supported. Located immediately above the plate B is an upper plate 1 having an annular upstanding flange 2, said upper plate 1 also being provided with a central opening 3, the utility of which will be subsequently pointed out.

The work-supporting portion C of my improved holding device is provided with a lower portion C' adapted to contact with the upper plate 1 of the base portion B of said holding device, said lower portion of said work-supporting portion being provided with a recess 4 which receives the upstanding flange 2 on said plate 1. The lower portion C' of the work-supporting portion of my improved holding device is also provided with a central threaded opening 6, which is adapted to be alined with the opening 3 when the device is assembled. 7 designates a bolt provided with a threaded portion adapted to be screwed into the threaded opening 6. Said bolt is also provided with a smooth portion which extends through the opening 3 in the plate 1. The bolt 7 is provided at its lower end with a nut 8 whereby the work-supporting portion C of the device is prevented from being accidentally disengaged from the base portion B.

The upper portion of the work-supporting portion of the holding device comprises an integral table 9 which is provided with a depressed portion 10. Mounted in the depressed portion 10 is an adjustable block 11. The depressed portion 10 is provided with an elongated slot 12 through which a stud bolt 13 passes. The stud bolt 13 is provided with a threaded portion at its upper end which screws into the block 11 and a threaded portion at its lower end which receives a nut 13' adapted to bear against the lower face of the depressed portion of the table 9. From the foregoing it is plain that the block 11 may be moved longitudinally of the depressed portion 10, it being necessary only to unscrew the nut 13' sufficiently to relieve the pressure against the lower face of said depressed portion, thus permitting said block to be moved to a new position where the nut 13' may again be caused to clamp said block 11 in place.

14 designates a second block similar to the block 11. The forward portion of the block 14 is located in a recess 15 formed in the block 11, and the lower face of said block 14 is provided with a rib 16 located in a groove 16' formed in the bottom face of said recess 15. The block 11 is provided with an elongated slot 11' similar to the elongated slot 12 already mentioned, said slot being formed longitudinally of the block 14 in that portion of the block 11 below the recess 15. 17 designates a stud bolt which passes through the slot 11' and screws into the block 14, said bolt being provided with a nut 17' which is adapted to firmly contact with the lower face of the block 11, thus making it possible, by unscrewing the nut 17' and moving the block 14 longitudinally of the recess 15, to adjust the block 14 relative to the block 11.

Mounted on the upper face of the block 11 is a secondary block 18 and mounted on the upper face of the block 14 is a similar secondary block 19. Each of the secondary blocks 18 and 19 is provided with a rib on its lower face which extends into a groove in the upper face of the associated blocks 11 and 14. Each of the secondary blocks 18 and 19 is also provided with an elongated slot 20 through which bolts 21 pass. The bolts 21 are screwed into threaded openings in the blocks 11 and 14 and are provided with enlarged portions adapted to firmly contact with the upper faces of the secondary blocks 18 and 19. From the foregoing it is apparent that when the bolts 21 are unscrewed the secondary blocks 18 and 19 may be moved longitudinally of the blocks 11 and 14, and it is also plain that when said bolts 21 are screwed downwardly said secondary blocks 18 and 19 will be held in a fixed position on said blocks 11 and 14. The secondary block 19 is provided with a comparatively thin forward portion 19', and the secondary block 18 is provided with a cutout portion 18' adapted to receive said thin forward portion. Thus, in the event that it is desired to move said secondary blocks forwardly to such extent that the forward ends of said blocks overlap, said forward movement may take place without said blocks interfering with each other.

Formed in the table 9 at a point adjacent to the blocks 11 and 14 is an elogated slot 22 through which a bolt 23 passes. The bolt 23 is provided with a lower threaded portion and an enlarged upper portion, said enlarged upper portion being of greater diameter than the shank of the bolt whereby a shoulder 23' is formed which rests upon the upper face of the table 9. A nut 24 is screwed onto the threaded lower portion of the bolt 23, and when said nut is screwed upwardly on the bolt a sufficient distance, the top face of said nut will contact with the lower face of the table 9, and as the shoulder 23' is drawn firmly against the upper face of said table the bolt will be clamped in a fixed position in the slot 22. The enlarged upper portion of the bolt 23 is bifurcated as indicated at 25, and an arm 26 is pivotally supported by said bifurcated portion. The rear end of the arm 26 is enlarged, and said enlarged portion is provided with a threaded opening which receives a screw 27. The lower end of the screw is in contact with the top face of the table 9 and the upper end thereof is provided with a knurled head whereby said screw may be conveniently rotated. From the foregoing it is apparent that if the screw 27 were rotated the enlarged rear end of the arm 26 would travel vertically on said screw, and because said arm is pivotally mounted on the bolt 23 the forward downturned end of said arm would likewise move vertically.

The cutting members M are provided with cutting faces Y and Z, and the exact angles of these faces, together with the exact radius of the corner R, is of the utmost importance to the successful operation of the boring tool of which said cutting members form parts. The cutting face Y, as is apparent in Fig. VIII, is inclined in a horizontal direction, and said face is also inclined in a vertical direction as shown in Fig. IX. The face Z is likewise inclined in a horizontal direction (Fig. VIII) and is inclined in a vertical direction as shown in Fig. X.

The cutting member M is located in place on the holding device and is brought into contact with the grinding element in the following manner:

The secondary blocks 18 and 19 are drawn rearwardly, and the screw 27 is rotated so as to move the forward downturned end of the pivoted arm 26 upwardly. The cutter is then placed on the work seat W. G designates a gage which is provided with a tapering lower portion adapted to be inserted into a similarly shaped opening in the bolt 7. The upper portion of the gage G is tubular in cross section and is provided with a cutout portion G' shaped to receive the corners R of the cutting members M (Fig. I).

Cutting members of various sizes are provided for use with my holding device and gages G are provided having cutout portions G' which vary according to the size of the cutting members being acted upon; for instance, the cutout portion of the gage used with the smallest cutting members is so shaped as to locate said cutting members at such distance relative to the grinding elements as to provide said cutting members with rather sharp corners, while the gages used with the larger cutting members are provided with cutout portions of such shape as to provide said cutting members with corners of greater radius. In this way the exact location of the cutting member M relative to the grinding element is established, and therefore, after the grinding has been accomplished the corner R will have the proper radius.

When the location of the cutting member M on the work seat W has been established with the aid of the gage G, as described, the secondary blocks 18 and 19 are moved forwardly until they contact with the edges $a$ and $b$ of said cutting member, whereupon the bolts 21 will be screwed downwardly to clamp said secondary blocks in place. The screw 27 is then rotated in a direction to cause the downturned forward end of the pivoted arm 26 to be brought into firm contact with the top face of said cutting member. Thus it is apparent that the secondary blocks 18 and 19 prevent the cutting member from moving laterally on the work-receiving seat W, and the pivoted arm 26 prevents said cutting member from moving upwardly from said work seat. It may be stated here that it is desirable to shift the point at which the forward end of the pivoted arm 26 contacts with the different sized cutting members, and this may be accomplished by unscrewing the nut 24 and moving the bolt 23 longitudinally of the slot 22, said nut being provided with an operating rod which extends through an opening in the work-supporting portion of the device whereby said nut may be easily turned.

When the cutting member M has been properly located in place on the work seat W and said cutting member is securely held in place by the secondary blocks 18 and 19 and the pivoted arm 26, the gage G is removed from the tapered opening in the bolt 7 and the cutting member is brought into engagement with the grinding element E.

The upper plate 1 of the base portion of my device is arranged at an inclination relative to the plate B' of said base portion, this inclination being approximately 3°, and the bolt 7, it will be noted by referring to Fig. IV of the drawings, is arranged at a right angle to said upper plate 1. The work seat W is also inclined, it being inclined approximately 3° relative to the inclined upper plate 1. Thus it is plain that the inclination of the work seat W relative to the plate B' of the base portion of the device is 6°.

The grinding element E is arranged so that its grinding face is perpendicular, consequently when the edge of the inclined cutting member is brought into contact with said grinding element (Fig. XI) a face is ground which is inclined 6° relative to the original rectangular edge of said cutting member. After the face Y has been ground as described, the handle H which is rigidly fixed to the work-supporting portion of the device is grasped and said work-supporting portion is rotated, during which rotation the corner R is ground by the rotating grinding element E (Fig. XII). The rotation of the work-supporting portion of the device is continued until same reaches the position illustrated in Fig. XIII, when the face Z is ground. The vertical inclination of the face Y, as has been stated, is 6° while the vertical inclination of the face Z is but 3°, and this change is obtained because of the fact that the work face W is inclined relative to the axis about which the work-supporting portion of the device rotates, and as the inclination of the work face is constantly changing while the work-supporting portion of the device is being rotated, the inclination of the cutting member is gradually reduced, so that while the vertical inclination of the cutting member is 6° when same is in the position in which it is shown in Fig. XI, the inclination thereof will be reduced to 3° when said cutting member reaches the position in which it is shown in Fig. XIII.

The horizontal inclinations of the faces Y and Z are established by means of a pair of stop faces 28 and 29, formed in the base portion B of the device, and a projection 30 on the work-supporting portion of said device. When the work-supporting portion C of the device is in the position shown in Fig. XI of the drawing, the projection 30 will contact with the stop face 28, thus preventing said work-supporting portion from being rotated further, and when the work-supporting portion C is in the position shown in Fig. XIII, the projection will contact with the stop face 29. Thus it is only necessary to rotate the work-supporting portion C as far as the stops will permit same to move to obtain cutting faces which are ground at the proper horizontal angle.

The blocks 11 and 14 have been illustrated and described as being adjustable relative to the work-supporting portion of the device. These blocks are thus arranged so that in the event it is desired to sharpen a cutting member of such large size that the secondary blocks will not move rearwardly a sufficient distance to permit said cutting member to be placed on the work seat W, the bolts 13 and 17 may be unscrewed and said blocks 11 and 14 moved rearwardly a sufficient distance to permit the reception of the cutting member between the secondary blocks 18 and 19.

It is, of course, necessary to provide a means whereby the grinding element E and the cutting members M may be moved toward each other during the grinding operation, and this is accomplished by mounting the grinding element on a shaft arranged in bearings E', and providing suitable means (not shown) for moving said grinding element.

I claim:

1. A holding device comprising a stationary base, a revoluble work support, an axis about which said work support rotates, an adjustable work-receiving seat on said work support, said work-support being provided with an elongated slot, and a clamping member associated with said work-receiving seat and passing through said elongated slot, said adjustable work-receiving seat being arranged at an oblique angle relative to said axis.

2. A holding device comprising a stationary base, a revoluble work support, an axis about which said work support rotates, and an adjustable work-receiving seat arranged on said work support at an oblique angle relative to said axis, said adjustable work-receiving seat comprising a pair of members slidably secured to said work support and slidably secured together.

3. A holding device comprising a stationary base, a revoluble work support, an axis about which said work support rotates, and an adjustable work-receiving seat arranged on said work support at an oblique angle relative to said axis, said adjustable work-receiving seat comprising a block slidably secured to said work support and a second block slidably mounted in a recess formed in said first mentioned block.

4. A holding device comprising a stationary base, a revoluble work support, an axis about which said work support rotates, a work-receiving seat arranged on said work support at an oblique angle relative to said axis, means comprising slidable members whereby the work is retained on said work-receiving seat, and clamping means extending through said slidable members whereby same may be clamped in various positions.

5. A holding device comprising a stationary base, a revoluble work support, an axis about which said work support rotates, a work-receiving seat arranged on said work support at an oblique angle relative to said axis, and means for retaining the work in place on said work-receiving seat comprising a pair of slidable blocks provided with elongated slots and clamping means extending through said elongated slots whereby said blocks may be clamped in various positions.

6. A holding device comprising a stationary base, a revoluble work support, an axis about which said work support rotates, a work-receiving seat arranged on said work support at an oblique angle relative to said axis, means comprising members provided with elongated openings whereby the work on said work-receiving seat is prevented from moving horizontally thereon, clamping means extending through said elongated openings whereby said members may be clamped in various positions, and means for preventing said work from moving upwardly from said work-receiving seat, said last mentioned means comprising a pivoted arm one end of which is adapted to contact with the top face of said work, and means at the other end of said arm for moving the first mentioned end of said arm toward and away from said work-receiving seat.

7. A holding device comprising a stationary base, a revoluble work support, an axis about which said work support rotates, a work-receiving seat arranged on said work support at an oblique angle relative to said axis, means comprising members provided with elongated openings whereby the work on said work-receiving seat is prevented from moving horizontally thereon, clamping means extending through said elongated openings whereby said members may be clamped in various positions, and means for preventing the work on said work-receiving seat from moving upwardly therefrom, said last mentioned means comprising a pivoted arm one end of which is adapted to contact with the top face of said work, and a threaded member at the other end of said pivoted arm for moving the first mentioned end of said arm toward and away from said work-receiving seat.

8. A holding device comprising a stationary base, a revoluble work support, an axis about which said work support rotates, a work-receiving seat arranged on said work support at an oblique angle relative to said axis, means comprising members provided with elongated openings whereby the work on said work-receiving seat is prevented from moving horizontally thereon, clamping means extending through said elongated openings whereby said members may be clamped in various positions, and means for preventing the work on said work-receiving seat from moving upwardly therefrom, said last mentioned means comprising a member adapted to engage the top face of the work on said work-receiving seat, said member being adjustably mounted so as to be capable of horizontal movement relative to said work-receiving seat.

9. A holding device comprising a stationary base, a revoluble work support, an axis about which said work support rotates, a work-receiving seat arranged on said work support at an oblique angle relative to said axis, means whereby the work on said work-receiving seat is prevented from moving horizontally thereon, and means for preventing the work on said work-receiving seat from moving upwardly therefrom, said last mentioned means comprising an arm an end of which is movable vertically and in a direction which is longitudinal of said arm, said end of said arm being adapted to contact with the top face of the work on said work-receiving table.

10. A holding device comprising a stationary base, a revoluble work support, an axis about which said work support rotates, an adjustable work-receiving seat arranged on said work support at an oblique angle relative to said axis, means whereby the work on said work-receiving seat is prevented from moving horizontally thereon, and means for preventing the work on said work-receiving seat from moving upwardly therefrom, said last mentioned means comprising a member movable toward and away from said work-receiving seat, an arm pivoted to said horizontally movable member, one end of said arm being adapted to contact with the work on said work-receiving seat and the other end thereof being provided with a screw for moving the first mentioned end of said arm toward and away from said work-receiving seat.

11. A holding device comprising a stationary base, a revoluble work support, an axis about which said work support rotates, an adjustable work-receiving seat arranged on said work support at an oblique angle relative to said axis, means comprising members provided with elongated openings whereby the work on said work-receiving seat is prevented from moving horizontally thereon, clamping means extending through said elongated openings whereby said members may be clamped in various positions, and means for preventing the work on said work-receiving seat from moving upwardly therefrom, said last mentioned means comprising a horizontally movable member, an arm pivoted to said horizontally movable member, one end of said arm being adapted to contact with the work on said work-receiving seat and the other end thereof being provided with a screw for moving the first mentioned end of said arm toward and away from said work-receiving seat, and a member on said work support adapted to contact with stop faces on said stationary base whereby the rotary movement of said work support is limited.

12. A grinding device comprising a grinding element, a stationary base having a face which is arranged at an oblique angle relative to the horizontal, a revoluble work support, and an axis about which said work support rotates, said work support being provided with a work-receiving seat which is arranged at an oblique angle relative to said axis, said revoluble work support being revolved to change the angle of said work-receiving seat relative to said grinding element.

In testimony that I claim the foregoing I hereunto affix my signature.

EMERY E. DAVIS.